June 7, 1938. J. C. DUNLAP 2,119,907
HEATING APPARATUS FOR LIQUID
Filed Dec. 28, 1935 2 Sheets-Sheet 1
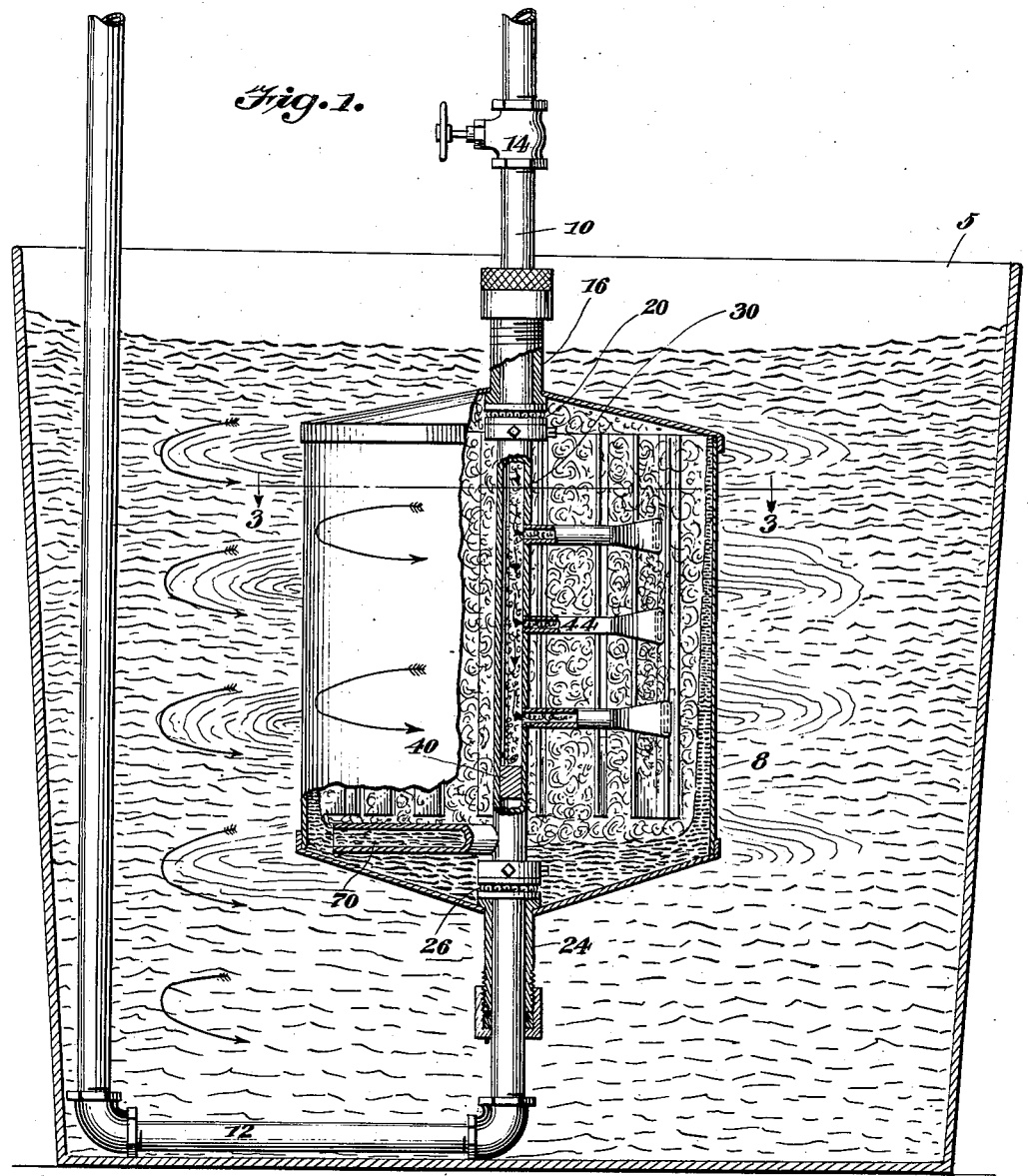
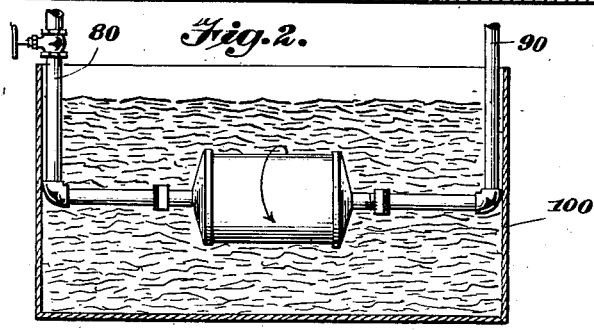
Inventor
JOHN C. DUNLAP
Attorney June 7, 1938.  J. C. DUNLAP  2,119,907
HEATING APPARATUS FOR LIQUID
Filed Dec. 28, 1935  2 Sheets-Sheet 2
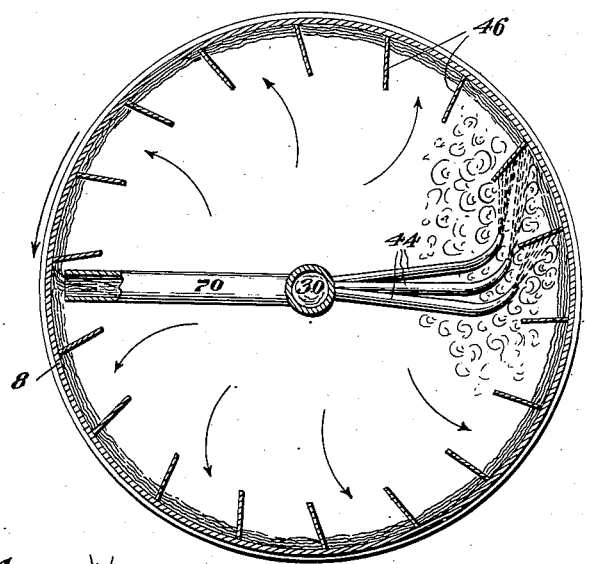
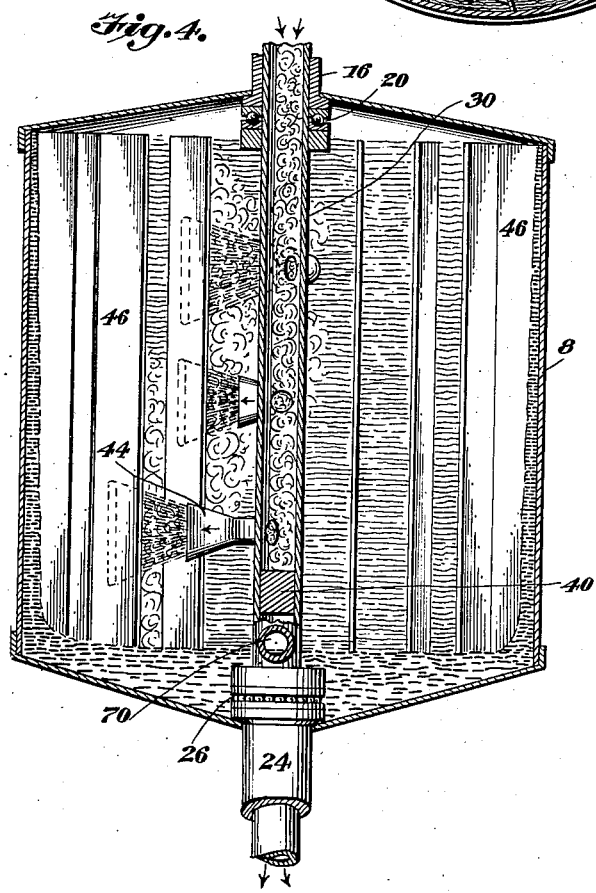
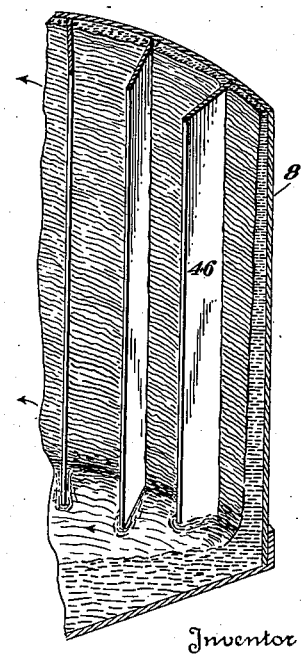
Inventor
JOHN C. DUNLAP
BY
Attorney Patented June 7, 1938

2,119,907

UNITED STATES PATENT OFFICE 2,119,907

HEATING APPARATUS FOR LIQUID

John C. Dunlap, Hutchinson, Kans.

Application December 28, 1935, Serial No. 56,561

3 Claims. (Cl. 257—74)

This invention relates to the processing of liquid and will be found to have special reference to a means for raising the temperature of the liquid as one step in the treatment of the same.

In milk plants, it will be found that two major methods are practiced in the large scale preheating of milk. Under one method, live steam is injected directly into the milk to raise the temperature thereof but this is expensive and disadvantageous for several reasons. For example, the injection of live steam directly into the milk involves an immediate and extremely heavy pull on the associated steam generating plant, adding appreciably to the fuel cost. In addition, the products of condensation from the live steam thus injected into the milk must later be evaporated through the use of heat, necessitating a further fuel charge and, of course, prolonging the period required for the evaporating process.

Under the other method of preheating milk, stationary heaters or coils are placed within the milk containing vats, and steam or some other heating medium is circulated therethrough without contacting the milk being heated. This method is wanting in efficiency because the exchange of heat is slow and the milk cooks on the heaters or coils, causing the liquid to become discolored and further coating or incrusting the heaters or coils to the point where the exchange of heat is seriously interfered with or obstructed. Also, there is to be considered the fact that this latter method makes no adequate provision for the milk circulation that is so necessary to efficient operation.

With an appreciation of the foregoing, the invention forming the subject of this application contemplates a preheater of the type suggested which is simple to operate, highly efficient in the use of fuel and which protects the surrounding milk or other liquid being treated against discoloration or other undesirable effects.

More particularly, the invention calls for the provision of a milk or other liquid containing vat within which there is located a conducting unit or drum for a heat bearing motive fluid and having means in the nature of vanes extending for substantially the entire length thereof and directly in the path of the discharging motive fluid so that the same will not only function as blades of a turbine to bring about rotation of the drum but at the same time as heat exchange mediums assisting in the transmission of heat from the motive fluid to the surrounding liquid.

Further, the arrangement of the drum will be found to be such that a layer of water of a definite depth is maintained between the incoming heat bearing motive fluid and the surrounding body of liquid to avoid over-heating the liquid and at the same time to avoid incrustation of the liquid contacting surface of the drum, all of which looks to efficient and economical operation.

By way of further brief preliminary reference to the invention, it might be pointed out that the rotation of the drum maintains a controlled agitation and definite circulation of the milk or other liquid without objectionable splashing and producing an even distribution of heat throughout the body of milk or other liquid being treated. This leads to the statement that the speed of the heating process may be easily regulated and the rapidity of the circulation of the milk or other liquid may be similarly regulated by the pressure fluid supply because, clearly, by increasing the supply of steam or possibly hot water, more heat is furnished and at the same time the drum is speeded up to accelerate circulation of the liquid being treated, while, on the other hand, a diminished supply of pressure fluid has less heating effect and the circulation of the milk or other fluid is slower.

Other objects and advantages will be apparent during the course of the following description.

In the accompanying drawings, forming a part of this application and in which like numerals are employed to designate like parts throughout the same, Figure 1 is a vertical sectional view through a milk containing vat embodying the invention, the heating and circulating unit being shown in an upright position, Figure 2 is a similar view with the heating unit arranged horizontally, Figure 3 is a horizontal sectional view taken on line 3—3 of Figure 1, Figure 4 is an enlarged detail vertical sectional view through the heating unit in actual operation, Figure 5 is a fragmentary sectional perspective of the drum in use.

In the drawings, the numeral 5 designates a milk containing vat of the kind employed in plants where milk is commercially evaporated. It is within the vat 5 that the milk is heated as a preliminary to feeding the milk to an evaporator where it is relieved of moisture.

As illustrated in Figure 1, a drum or hollow cylinder 8 is positioned centrally within the vat and has connection at opposite ends thereof with steam feeding and exhaust pipes 10 and 12, respectively. A valve 14 in the pipe 10 provides a simple means by which the supply of steam to the drum may be regulated.

In carrying out the invention, the cone-shaped upper end of the drum may have connection with an attaching sleeve 16 which, in turn, is rotatably mounted upon the inlet pipe 10 and upon anti-friction elements 20 of any kind.

The cone-shaped lower end of the drum 8 is shown to be mounted upon what might be said to be the inner portion of a second attaching sleeve 24. This second sleeve 24 is rotatably mounted upon the adjacent portion of the exhaust line 12. Suitable anti-friction elements 26 are associated with the sleeve 24 and cooperate with the anti-friction elements 20 in providing for the easy rotation of the drum under the influence of the incoming steam.

The outer terminal portions of the sleeves 16 and 24 are shown to be provided with appropriate packing glands avoiding escape of the steam and thus preventing it from mixing with the milk being treated.

It is further illustrated in Figure 1 that what might be said to be a compound manifold 30 is positioned between the feed and exhaust members 10 and 12 and has a partition in the nature of a plug 40 dividing the manifold into feed and exhaust portions.

Referring now to Figures 1 and 3, it will be seen that a plurality of nozzles 44 are carried by the inlet portion of the manifold 30 at longitudinally spaced points and project radially therefrom. The outer or discharge terminal portions of the nozzles 44 are curved for directing the heating and motive fluid into pressure contact with the surrounding vanes 46. The vanes are rigidly carried by the peripheral wall of the drum so that the impingement of the discharging steam against the vanes rotates the drum. It is important to observe that the internal vanes 46 extend axially for practically the entire length of the drum and hence not only function as impact elements for engagement by the steam but at the same time serve as heat exchange mediums. That is to say, the vanes 46 are directly in the path of and are engaged by the steam discharged from the nozzles and since the vanes extend for the major portion of the length of the drum, they act as effective heat transmitting mediums, transferring the heat of the steam to the drum and the latter dispersing the heat directly to the milk within the container or vat 5.

From the matter shown in Figure 3, it will be apparent that the drum is self-starting. The turbine blades are preferably about 10 degrees apart while each nozzle is approximately 7½ degrees in advance of the other so that regardless of the position of the drum, two of the nozzles are constantly directed toward the impact surface of one blade. In this way, the admission of steam to the drum will be followed by the prompt rotation of the drum without special priming of any kind.

In operation, the speed of rotation of the drum and the rapidity of the heating operation may be regulated through control of the steam admitted to the drum.

As brought out in the opening paragraphs of this specification, one of the important features of the invention has to do with the maintenance of a layer of water between the incoming steam and the surrounding body of milk so as to protect the milk against over-heating. In explaining this, attention is invited to Figure 4 where it is shown that the products of condensation accumulate in a layer about the peripheral wall of the drum and thus come between the steam discharged from the nozzles and the surrounding body of milk. Centrifugal force maintains this layer of water about the inner peripheral wall of the drum and, of course, this remains during the entire period of rotation of the drum. The presence of the vanes 46 also assists in the maintenance of a film of water of uniform depth about the peripheral portion of the drum. In installations where the drum is mounted vertically, the protecting wall of water tapers in depth toward the top of the drum, somewhat after the fashion suggested in Figures 4 and 5.

By renewed reference to Figure 1, it will be seen that the discharge portion of the manifold 30 has an inlet branch or pipe 70 projecting radially to a point inward of and in spaced relation to the peripheral wall of the drum. By regulating the length of the exhaust branch 70, the depth of the protective layer of water carried by the peripheral portion of the drum may be fixed. In other words, it is the space or distance between the peripheral wall of the drum and the inlet opening of the exhaust branch that determines the depth of the layer of water carried by the peripheral portion of the drum.

It has been found in practice that the pressure of the steam within the drum assists in the easy discharge of condensation water from the drum notwithstanding centrifugal force accompanying rotation of the drum.

From the foregoing, it will be apparent that the use of the invention contemplates the constant segregation of the steam and milk. By reason of this, there is avoided the need of separating the products of condensation from the milk as is necessary where the live steam is injected directly into the milk. This reduces the fuel cost. Also, the rapid exchange of heat from the steam to the surrounding milk accounts for a further reduction in the fuel cost.

Since the drum is constantly rotated, it maintains a constant and well defined circulation of the entire body of milk without undue splashing and undue agitation so that the entire body of milk is uniformly and simultaneously raised in temperature.

At the same time, the rotation of the drum and the presence of the layer of water immediately inward of the peripheral wall of the drum prevents the milk from cooking on the drum and in this way, the efficiency of the drum as a heat transmiting medium is maintained.

As previously brought out, the rapidity of the heating operation may be varied by the regulation of the steam admitted to the drum.

In most milk plants where a machine of this kind would be used, there is sufficient exhaust steam available for the operation of the machine. In fact, the exhaust steam from the vacuum pump affords a supply that is adequate under most circumstances, it being understood, of course, that suitable means are employed to place such steam under sufficient pressure to effect the required rotation of the drum. This exhaust steam is many times wasted or is merely used for the boiler make-up water so that the use of such exhaust steam for preheating milk as contemplated herein represents a substantial saving.

The invention forming the subject of this application is capable of a variety of mechanical expressions. For example, as shown in Figure 2, the drum may be arranged horizontally with steam inlet and exhaust pipes 80 and 90, respectively, connected to opposite ends thereof, the drum, of course, being positioned more or less centrally in a tank or vat 100. In addition, the invention has been described for use in the particular field in which it was developed but, of course, it is capable of use in raising the temperature of vinegar and numerous other liquids. By the same token, hot water may be employed in lieu of steam. Therefore, it is to be understood that the invention as herein shown and described is to be taken as a preferred example of the same and that such changes in arrangement and construction of parts may be made as will remain within the spirit of the invention and the scope of what is claimed.

Having thus described the invention, what is claimed is:

1. In a structure for heating milk as a preliminary to the evaporation of the milk, a drum adapted to be mounted in a milk container, steam feeding and exhaust pipes arranged in longitudinal alignment at opposite end portions of the drum, a compound manifold connected to said feeding and exhaust pipes and having inlet and exhaust portions, the inlet portion of said manifold being provided with longitudinally spaced nozzles advanced circumferentially, one with respect to the other, vanes carried by the peripheral portion of said drum and spaced circumferentially from each other distances greater than the circumferential spacing of said nozzles, means rotatably connecting said drum to said feeding and exhaust pipes, the exhaust portion of said manifold being provided with an inlet branch having definitely spaced relation to the peripheral portion of said drum.

2. In a structure for heating a liquid in a container, a drum rotatably mounted in the container and surrounded by the liquid to be heated, longitudinally spaced nozzles within said drum and advanced circumferentially, one with respect to the other, internal vanes carried by said drum and spaced circumferentially from each other distances greater than the circumferential spacing of said nozzles, and means for supplying fluid under pressure to said nozzles to be discharged thereby into contact with said vanes for effecting rotation of said drum.

3. In a structure for heating a liquid in a container, a drum rotatably mounted in the container and surrounded by the liquid to be heated, nozzles within said drum and having discharge portions advanced circumferentially, one with respect to the other, internal vanes carried by said drum and spaced circumferentially from each other distances greater than the circumferential spacing of the discharge portions of said nozzles, and means for supplying fluid under pressure to said nozzles to be discharged thereby into contact with said vanes for effecting rotation of said drum.

JOHN C. DUNLAP.